UNITED STATES PATENT OFFICE.

WILLIAM H. R. TOYE, OF NEW YORK, N. Y., ASSIGNOR TO THE FABRIC ORNAMENTING AND MANUFACTURING COMPANY, OF SAME PLACE.

PROCESS OF PREPARING COLORS FOR ORNAMENTING FABRICS.

SPECIFICATION forming part of Letters Patent No. 250,302, dated November 29, 1881.

Application filed August 15, 1881. (No specimens.)

*To all whom it may concern:*

Be it known that I, WILLIAM H. R. TOYE, a citizen of the United States, residing in the city, county, and State of New York, have invented a new and useful Process of Preparing Colors for Ornamenting Fabrics, of which the following is a specification.

In Letters Patent No. 238,991, granted to me on the 15th of March, 1881, I have described and claimed a process of ornamenting paper and other like fabrics, which consists in applying to the surface of the fabric to be ornamented an adhesive substance or composition; in depositing upon the surface thus prepared different colors in a dry pulverulent condition, these being laid down in small masses or heaps, partially or wholly detached from each other; in distributing and more or less intermingling the different masses or deposits of color; and, finally, in subjecting the powdered surface to pressure, whereby the colors are fixed to the fabric through the medium of the adhesive ground first applied. In said Letters Patent I have also described the necessary mechanical instrumentalities for carrying out the said process of ornamenting fabrics.

My present invention relates to the preparation of the pulverulent colors which are employed in carrying out the invention hereinbefore referred to.

In practicing the said invention I have found that most of the ordinary powdered colors which are commercially sold are unsuitable for use in the said process.

My invention consists in an improved process whereby powders of any required tint, color, or shade may be produced, and which are well adapted for use in the machine, and for the process of ornamenting fabrics, set forth in my said Letters Patent No. 238,991.

In carrying out my invention I first form a pasty mixture consisting of commercial powdered starch, powdered talc, and water, to which mixture I then add a small proportion of acid—preferably sulphuric or picric acid. I prefer to combine these materials substantially in the following proportion: Twenty pounds of starch to four pounds of talc, with sufficient water to mix thoroughly and form a thick paste, to which is added two ounces of the acid. To the paste thus prepared, which is of a white or neutral color, I add any required color or colors, according to the tint or shade which is desired. The coloring material may be either in a liquid or pulverulent form, and should be thoroughly incorporated with the soft paste by stirring or other suitable means, so that the whole mass will present a uniform appearance to the eye. The colored paste thus formed is next dried by means of continuous and moderate heat. The drying may be effected by exposing the paste to the sun, or by placing it in a suitable kiln, care being taken that the temperature to which the material is exposed shall not in any case exceed 150° of Fahrenheit's scale. After the material has become thoroughly dry it is reduced to a fine powder by the aid of suitable mechanical means—such, for example, as the apparatus ordinarily used for sifting wheat flour for domestic purposes.

The powders of different colors thus produced will be found to be suitable in every respect for the purpose of ornamenting paper or other material according to the process described in my former patent, while at the same time they are much less expensive than the ordinary commercial colors.

In drying the colored mixture care must be taken not to expose it to a degree of heat in excess of that hereinbefore mentioned, for the reason that at a higher temperature a portion of the starch will be converted into dextrine, which will prevent the subsequent pulverization from being conveniently effected.

The object of employing a small proportion of acid is to intensify and set the colors.

The proportions of the different materials of which the mixture is composed may be varied considerably from that hereinbefore given, if desired, while the powdered talc may be dispensed with altogether, although the ornamental appearance of the fabrics treated by the process is materially enhanced by its use.

I claim as my invention—

The hereinbefore-described process of manufacturing colors for ornamenting fabrics, which consists in forming a pasty mixture of pulverized starch, powdered talc, and acid, substantially in the proportions specified, adding suitable commercial colors thereto to produce the tint required, drying the same by moderate heat, and finally sifting or pulverizing the compound, as set forth.

In testimony whereof I have hereunto subscribed my name this 13th day of August, A. D. 1881.

WILLIAM H. R. TOYE.

Witnesses:
WILLIAM H. KENYON,
MILLER C. EARL.